H. R. RICARDO.
INTERNAL COMBUSTION ENGINE.
APPLICATION FILED SEPT. 4, 1917.
1,297,248.
Patented Mar. 11, 1919.
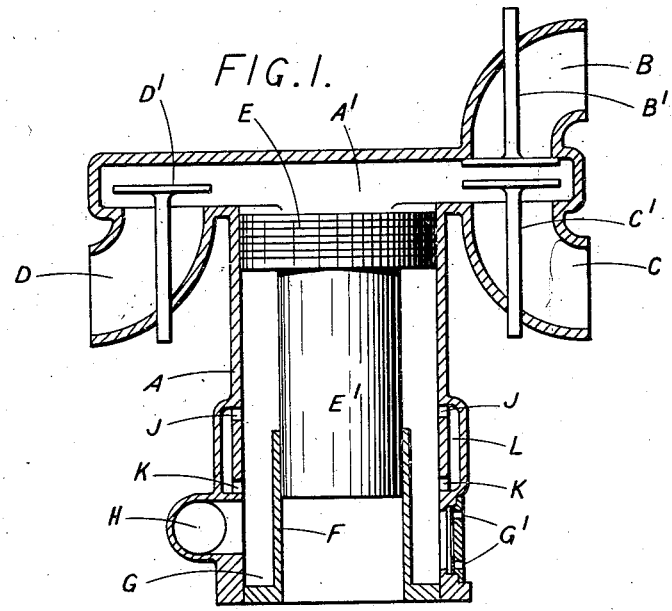
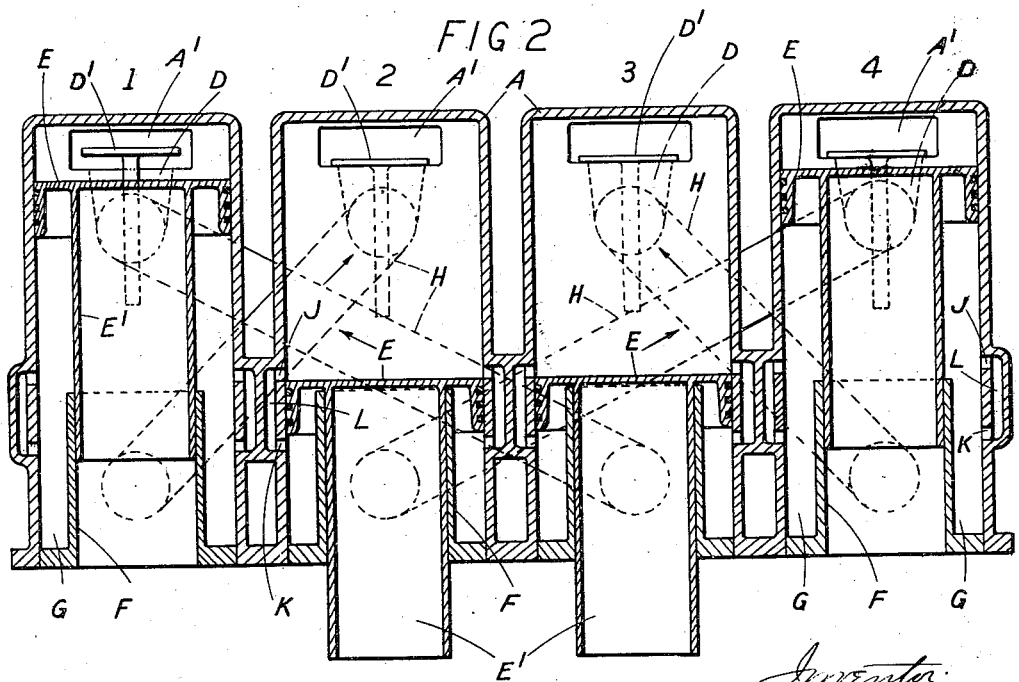

UNITED STATES PATENT OFFICE.

HARRY RALPH RICARDO, OF LONDON, ENGLAND.

INTERNAL-COMBUSTION ENGINE.

1,297,248.  Specification of Letters Patent.  Patented Mar. 11, 1919.

Application filed September 4, 1917. Serial No. 189,644.

*To all whom it may concern:*

Be it known that I, HARRY RALPH RICARDO, subject of the King of England, residing at London, in England, have invented certain new and useful Improvements in Internal-Combustion Engines, of which the following is a specification.

This invention relates to internal combustion engines more especially those engines having three or more cylinders which operate on the four-stroke cycle and employ supercharging and has for its object to effect certain improvements in the scavenging of the cylinders and the supply of supercharges thereto.

In four cycle engines employing positive scavenging and supercharging and in which both the scavenging air and the supercharge are admitted through ports in the cylinder wall uncovered by the piston at the bottom of its stroke, it has been found that the air scavenging charge is of but little value either as a cooling agent or as a means of increasing the air content of the cylinder. It appears that the great turbulence in the cylinder due to the sudden drop of pressure when the exhaust valve is first opened results in excessive diffusion between the scavenging air and residual exhaust gases with the result that the bulk of the air admitted for this purpose is expelled through the exhaust valve and the proportion retained in the cylinder is not sufficiently large to justify the work done in compressing it. Furthermore the action of this air as a cooling agent is very largely neutralized by the fact that in a petrol engine combustion is seldom complete by the end of the expansion stroke with the result that the oxygen of the air combined with the CO which is always present to a greater or lesser degree to form $CO_2$ and the heat liberated by this combination is sufficient to neutralize to a very large extent any cooling action due to the air scavenge. This latter difficulty can be overcome by utilizing cooled exhaust gases for the scavenging charge and though this has proved highly satisfactory in practice, it is clear that the air content of the cylinder and therefore the mean effective pressure is not increased thereby.

According to this invention compressed air drawn from a suitable source of supply is admitted for scavenging through a valve-controlled port provided for the purpose at or near the head of the cylinder during the latter part of the exhaust stroke of the piston therein while during the latter part of the charging stroke of this piston some of this air is admitted for supercharging through ports provided for the purpose in the length of the cylinder wall. Each cylinder is provided with a separate valve-controlled opening through which the scavenging charge is admitted. This valve is opened during the latter part of the exhaust stroke at a time when the bulk of the products of combustion have been expelled from the cylinder in the ordinary way through the usual valve-controlled exhaust opening. At this time the temperature of the gases in the cylinder and the turbulence will have considerably declined while the pressure of the exhaust products in the cylinder will have fallen nearly to that of the atmosphere. This valve which is preferably operated mechanically is timed to open or commence opening when the piston has traveled through some 30% to 50% of its exhaust stroke and the valve remains lifted until the exhaust stroke is completed, the opening being closed at approximately the same time as the separate exhaust valve. The admission of air during this period of the exhaust stroke when both the temperature and pressure have fallen, when the bulk of the exhaust gases have been expelled and when the turbulence has died down considerably, drives out the residual products of combustion and replaces them to a considerable extent with pure air so that the clearance space contains substantially pure air when the suction stroke commences.

The air supply for scavenging in this way and for supercharging may be derived from some suitable source. For example, the piston in each cylinder may be of the differential type, that is to say, having that face which is opposite to that face on which the working charge acts formed with an annular part which operates as a pump piston in the outer end of the cylinder. In this case the end of one cylinder which constitutes the pump chamber is connected on the one hand to ports so disposed in the length of the wall of that cylinder that when the piston is at or about the end of its out-stroke these ports will be uncovered and air from the pump side of the piston can pass to the other side of the piston. On the other hand this pump chamber is also in communication with the valve-controlled opening in the head of another cylinder. In this way the pump chamber at the end of one cylinder will serve to supply alternately a supercharge to the same cylinder and a scavenging charge for the clearance space in the head of another cylinder.

The air employed for scavenging and supercharging purposes in the manner described may be derived from a separate pump or blower of suitable type. Air may thus be delivered under pressure to separate chambers connected respectively with the ports in the wall of one cylinder and the scavenging valve in the head of another cylinder or the air under pressure may be delivered to a suitable receptacle which will serve as a common air supply chamber whence air will be drawn for both supercharging and scavenging purposes for each cylinder in succession.

The details of construction may be varied to meet requirements and the nature and type of engine to which the invention is applied. The scavenging valve may be operated in such manner as is found convenient and if desirable the passage through which air is led to the ports in the wall of each cylinder may be controlled by a valve so as to prevent gas from passing through these ports when they are uncovered at the end of the exhaust stroke of the piston in that cylinder.

In the accompanying drawings which illustrate by way of example and somewhat diagrammatically the invention as applied to a four cylinder internal combustion engine, Figure 1 is a longitudinal vertical section through one cylinder of the group the section being taken in a plane at right angles to the crank shaft axis, and Fig. 2 is a vertical sectional elevation through all the cylinders of the group, the section being taken in a plane coincident with the crank shaft axis.

Like letters indicate like parts throughout the drawings.

Each cylinder A is provided with the usual inlet and exhaust passages B and C with ports respectively controlled by the valves B' and C', these passages opening into and leading from a combustion space A' at the head of the cylinder. A separate passage D serving for the introduction of the scavenging air is also provided this passage terminating in a port, controlled by a valve D' which opens into the combustion space A'. In the preferred construction illustrated each piston is of the differential type and an annular portion of its outer face acts as a pump piston. The piston comprises a head portion E which reciprocates in the cylinder A and a trunk portion E' of less diameter which reciprocates as a guide in a cylinder F suitably disposed at or within the outer end of the cylinder A. Around the guide cylinder F is an annular chamber G which serves as a pump chamber and from this chamber leads a pipe H preferably of substantial dimensions. Through this pipe H air compressed in the chamber G of one cylinder by the annular face of the piston E in that cylinder is conveyed to the scavenging inlet D of another cylinder. This air is drawn into the chamber G through valve-controlled opening G' in the outer wall of the chamber G which outer wall may be formed as shown by the outer end portion of the cylinder A.

At suitable points in the length of the cylinder A are provided two series of ports J and K each series opening into a common annular chamber L so that gases can pass from one set or ring of ports to the other through this chamber L. The ports J are so positioned that they will be uncovered by the piston E as it nears the end of its outstroke. The ports K are so positioned that they always remain open and will not be covered by the skirt of the piston head E. Thus when the piston is at the end of its outstroke, that is to say in the position shown in cylinder No. 2 in Fig. 2, air can pass from the chamber G through the ports K, annular chamber L and ports J past the piston and into the main part of the cylinder A behind it.

Referring to Fig. 2 the cylinders are numbered consecutively for convenience of reference. The pistons in these cylinders are connected to cranks set at 180°, the pistons in the cylinders Nos. 1 and 4 being connected to similarly disposed cranks while the remaining two cranks which are set oppositely are connected to the pistons in the cylinders Nos. 2 and 3. The inlet and exhaust valves of the several cylinders are so timed that the strokes performed by the pistons in the respective cylinders are performing simultaneously the following strokes when these pistons are in the positions shown in Fig. 2. In cylinder No. 1 the piston E has just completed its exhaust stroke. In cylinder No. 2 the piston has just reached the end of its suction or charging stroke. In cylinder No. 3 the piston is just at the end of its working stroke. Finally in cylinder No. 4 the piston E has just completed its compression stroke. The several pump chambers G and scavenging inlets D are coupled by the pipes H in the manner indicated in dotted lines. Thus the pump chamber G of cylinder No. 1 communicates by a pipe H with the scavenging inlet D which opens into the combustion chamber A' of cylinder No. 2. The pump chamber G of cylinder No. 2 communicates by a pipe H with the scavenging inlet D of cylinder No. 4. The pump chamber of cylinder No. 3 communicates with the scavenging inlet of cylinder No. 1. Finally the pump chamber G of cylinder No. 4 communicates by a pipe H with the scavenging inlet D which opens into the combustion chamber A' of cylinder No. 3.

When the pistons in the several cylinders are in the positions shown in Fig. 2 and performing the strokes as already mentioned the transference of gases is taking place in the following way. In cylinder No. 1 as the piston has just completed its exhaust stroke the exhaust port C is open owing to the valve C' having been lifted. The scavenging valve D' controlling the inlet D has also been lifted. The positions in which the several valves are shown in Fig. 1 coincides with the positions occupied by the valves in cylinder No. 1 at this stage. Owing to the scavenging inlet D being in communication with the pump chamber G of cylinder No. 3 in which cylinder the piston has now completed an outstroke, air which has been compressed in the pump chamber G of cylinder No. 3 is free to pass through the inlet D into the combustion chamber A' of cylinder No. 1. As the valve D' is timed not to be lifted until a suitable time has elapsed after lifting the exhaust valve C' a considerable proportion of the products of combustion in cylinder No. 1 will have passed to exhaust through the outlet C before air enters through the scavenging inlet D. Consequently this air will perform effectual scavenging of the cylinder and combustion chamber A' and the products of combustion will be swept out of the cylinder.

While the piston in cylinder No. 1 is performing its exhaust stroke air is being drawn into the pump chamber G of that cylinder by the annular part of the piston E in readiness for compressing this air on the next outstroke of the piston.

In cylinder No. 2 the piston has just completed its suction stroke and during this stroke air has been compressed in the pump chamber G. As soon as the piston uncovers the ports J this compressed air can pass through the ports K, intermediate chamber or passage L, and ports J, into the main part of the cylinder whereby a supercharge of air is added to the main charge that has been drawn in by the outstroke of the piston. Owing to the timing of the inlet valve D' controlling the scavenging inlet to cylinder No. 4 this inlet remains closed and consequently air from the pump chamber G of cylinder No. 2 cannot now pass to cylinder No. 4.

In cylinder No. 3 as mentioned the piston has completed its working stroke and at the same time compressed air in the pump chamber G. Toward the end of this stroke the ports J have been uncovered but the pressure on the two sides of the piston will differ for so short a time that in effect there will be no tendency for any great quantity of the products of combustion to pass into the pump chamber G before the exhaust valve is opened. The timing of the opening of this exhaust valve is preferably so regulated that it will not be fully opened until the crank is on or past its dead center and there might then be a tendency for air to pass from the pump chamber G into the main part of the cylinder owing to the decrease of pressure in the latter. The ports J are however positioned where they will be quickly covered and closed by the piston on its return stroke and hence the amount of air which could thus pass would in any case be inconsiderable but in effect air in any appreciable quantity will not so pass because the pressure in the pump chamber G is small owing to the opening of the valve D' controlling the scavenging inlet D of cylinder No. 1. The fact that the opening leading from the pump chamber G to the pipe H, as also this pipe together with the inlet D, are all of substantial dimensions, while the ports K and J are relatively small, the air will in any event tend to pass more readily at this stage from the pump chamber of cylinder No. 3 to the air inlet of cylinder No. 1, than from the pump chamber of cylinder No. 3 into the main part of that cylinder behind the piston.

In cylinder No. 4 the piston is at the end of its compression stroke and its pump face has just completed its suction stroke in the pump chamber G. The scavenging valve D' in this cylinder is of course at this stage closed.

As will be apparent the connections between the combustion chambers of the several cylinders and the pump chambers may be variously arranged as found convenient and in accordance with the number of cylinders and the setting of the cranks. It is usually desirable to cool the air after compression and before it is delivered into the combustion chambers of the cylinders and to this end the passages H may be variously constructed or arranged. Thus the whole or a portion of each pipe or passage H may be subjected to such cooling by water or air as will cool to the desired extent the compressed air passing through it. For example in place of forming each passage H as a simple pipe there may be arranged as part of the passage a series of relatively small tubes carried through a chamber or jacket in which water circulates around the tubes. Various known forms of such structures may be employed. The timing of the several scavenging inlet valves D' and their operation may be arranged and effected in various ways as found convenient.

What I claim as my invention and desire to secure by Letters Patent is:—

1. In an internal combustion engine operating on the four-stroke cycle the combination of a plurality of cylinders not less than three in number, a piston in each cylinder, a valve-controlled inlet port adjacent to the head of each cylinder, ports in the wall of each cylinder positioned where they will be uncovered by the piston toward the end of its outstroke, a source of supply of compressed air, means for delivering compressed air from this source of supply to the piston controlled ports of each cylinder, and means for delivering compressed air from the source of supply to the valve-controlled inlet port of each cylinder as set forth.

2. In an internal combustion engine operating on the four stroke cycle the combination of a plurality of cylinders not less than three in number, a piston in each cylinder, two valve-controlled ports adjacent to the head of each cylinder and serving respectively for the introduction of the combustible charge and the escape of the products of combustion, a separate valve-controlled inlet port adjacent to the head of each cylinder serving for the introduction of scavenging air, ports in the wall of each cylinder positioned where they will be uncovered by the piston toward the end of its outstroke, a source of supply of compressed air, means for delivering compressed air from this source of supply to the piston controlled ports of each cylinder, and means for delivering compressed air from the source of supply to the separate valve-controlled inlet port of each cylinder as set forth.

3. In an internal combustion engine operating on the four stroke cycle the combination of a plurality of cylinders not less than three in number each cylinder being formed with a pump chamber at one end thereof, a piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering air compressed in the pump chambers of the cylinders to the piston controlled ports of the cylinders, and means for delivering compressed air from these chambers to the valve-controlled inlet ports of the cylinders as set forth.

4. In an internal combustion engine operating on the four stroke cycle the combination of a plurality of cylinders not less than three in number each cylinder being formed with a pump chamber at one end thereof, a piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering air compressed in the pump chamber of each cylinder to the piston controlled ports of the same cylinder, and means for delivering compressed air from the cylinder pump chambers to the valve controlled inlet ports of the cylinders as set forth.

5. In an internal combustion engine operating on the four stroke cycle the combination of a plurality of cylinders not less than three in number each cylinder being formed with a pump chamber at one end thereof, a piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering compressed air from the cylinder pump chambers to the piston controlled ports of the cylinders, and means for delivering air compressed in the pump chamber of each cylinder to the valve-controlled inlet port of another cylinder as set forth.

6. In an internal combustion engine operating on the four stroke cycle the combination of a plurality of cylinders not less than three in number each cylinder being formed with a pump chamber at one end thereof, a piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering air compressed in the pump chamber of each cylinder to the piston controlled ports of the same cylinder, and means for delivering air compressed in the pump chamber of each cylinder to the valve-controlled inlet port of another cylinder as set forth.

7. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering air compressed in the pump chambers of the cylinders to the piston controlled ports of the cylinders, and means for delivering compressed air from these chambers to the valve-controlled inlet ports of the cylinders as set forth.

8. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering air compressed in the pump chamber of each cylinder to the piston controlled ports of the same cylinder, and means for delivering air compressed in the pump chamber of each cylinder to the valve-controlled inlet port of another cylinder as set forth.

9. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, ports in the wall of the pump chamber end of each cylinder with a communication between these ports and the piston controlled ports of the same cylinder so that air after compression in the pump chamber can pass as a supercharge through these ports into the cylinder at the other side of the piston, and means for delivering compressed air from the cylinder pump chambers to the valve-controlled inlet ports of the cylinders as set forth.

10. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, means for delivering air compressed in the pump chambers of the cylinders to the piston controlled ports of the cylinders, and a pipe serving as a communication between the pump chamber of each cylinder and the valve-controlled inlet port of another cylinder by means of which pipe air compressed in the pump chamber of each cylinder is delivered into another cylinder for scavenging purposes as set forth.

11. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, a valve-controlled inlet port adjacent to the head of each cylinder, ports in the wall of each cylinder positioned where they will be uncovered by the piston toward the end of its outstroke, ports in the wall of the pump chamber end of each cylinder with a communication between these ports and the piston controlled ports of the same cylinder so that air after compression in the pump chamber can pass as a supercharge through these ports into the cylinder at the other side of the piston, and a pipe serving as a communication between the pump chamber of each cylinder and the valve-controlled inlet port of another cylinder by means of which pipe air compressed in the pump chamber of each cylinder is delivered into another cylinder for scavenging purposes as set forth.

12. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, two valve-controlled ports adjacent to the head of each cylinder and serving respectively for the introduction of the combustible charge and the escape of the products of combustion, a separate valve-controlled inlet port adjacent to the head of each cylinder serving for the introduction of scavenging air, ports in the wall of each cylinder positioned where they will be uncovered by the piston toward the end of its outstroke, means for delivering air compressed in the pump chamber of each cylinder to the piston controlled ports of the same cylinder, wherein this air serves as a supercharge, and means for delivering air compressed in the pump chamber of each cylinder to the valve-controlled inlet port of another cylinder wherein this air serves for scavenging purposes as set forth.

13. In an internal combustion engine operating on the four stroke cycle the combination of a plurality of cylinders not less than three in number each cylinder being formed with a pump chamber at one end thereof, a differential piston in each cylinder operative to compress air in the pump chamber end of the cylinder, two valve-controlled ports adjacent to the head of each cylinder and serving respectively for the introduction of the combustible charge and the escape of the products of combustion, a separate valve controlled inlet port adjacent to the head of each cylinder serving for the introduction of scavenging air, a valve-controlled inlet port in each cylinder pump chamber, ports in the wall of each cylinder positioned where they will be uncovered by the piston toward the end of its outstroke, ports in the wall of the pump chamber end of each cylinder with a communication between these ports and the piston controlled ports of the same cylinder so that air after compression in the pump chamber can pass as a supercharge through these ports into the cylinder at the other side of the piston, and a pipe serving as a communication between the pump chamber of each cylinder and the valve-controlled inlet port of another cylinder by means of which pipe air compressed in the pump chamber of each cylinder is delivered into another cylinder for scavenging purposes as set forth.

In testimony whereof I have signed my name to this specification in the presence of two subscribing witnesses.

HARRY RALPH RICARDO.

Witnesses:
ERNEST PASK,
R. BAGGOTT.